US011915675B2

(12) United States Patent
O'Hanlan

(10) Patent No.: US 11,915,675 B2
(45) Date of Patent: Feb. 27, 2024

(54) COMMUNICATIONS SYSTEM, RETROFIT CABLING KIT, AND RETROFIT CONNECTOR INTERFACE

(71) Applicant: BookerLab, LLC, Liberty, SC (US)

(72) Inventor: Thomas B. O'Hanlan, Liberty, SC (US)

(73) Assignee: BOOKERLAB, LLC, Liberty, SC (US)

(*) Notice: Subject to any disclaimer, the term of this patent is extended or adjusted under 35 U.S.C. 154(b) by 380 days.

(21) Appl. No.: 17/150,163

(22) Filed: Jan. 15, 2021

(65) Prior Publication Data

US 2021/0217392 A1 Jul. 15, 2021

Related U.S. Application Data

(60) Provisional application No. 62/961,432, filed on Jan. 15, 2020.

(51) Int. Cl.
*G10H 1/00* (2006.01)

(52) U.S. Cl.
CPC ..... *G10H 1/0041* (2013.01); *G10H 2240/201* (2013.01)

(58) Field of Classification Search
CPC ...................... G10H 1/0041; G10H 2240/201
USPC ........................................................ 84/609
See application file for complete search history.

(56) References Cited

U.S. PATENT DOCUMENTS 3,584,530 A * 6/1971 Andersen ............ G10H 1/0008 984/302
3,604,299 A * 9/1971 Englund ............. G10H 1/0041 984/304
3,710,035 A * 1/1973 Tupaj .................. G11B 25/063 360/137
4,129,352 A * 12/1978 Iizuka ................. H01R 24/568 D13/133
5,110,999 A * 5/1992 Barbera ............ H01B 11/1091 174/113 C
D336,302 S 6/1993 Kwang
D341,353 S 11/1993 O
5,445,539 A * 8/1995 Dale ..................... H02G 3/083 174/53
D366,025 S 1/1996 Siemon (Continued)

FOREIGN PATENT DOCUMENTS

EP 2333791 A2 * 6/2011 ............ H01B 11/12
KR 20090051277 A * 5/2009

(Continued)

OTHER PUBLICATIONS

Hammond Organ Owner's Playing Guide, for the New B-3 / New C-3 Console Model Organ, Hammond Suzuki, Ltd., 00457-40074, version V1.0-0203, undated, see Amendment Remarks.

(Continued)

*Primary Examiner* — Christina M Schreiber

(74) *Attorney, Agent, or Firm* — JK Intellectual Property Law, PA

(57) ABSTRACT

A retrofit cabling kit is suitable for use connecting an organ and a speaker, wherein the organ may be one of a Hammond® brand, model B3 or C3 organ and the speaker may be one of a Leslie® brand, model 122 or 147 speaker. The kit may include interfaces for attachment to each of the organ and the speaker and cables connecting the interfaces.

21 Claims, 8 Drawing Sheets

(56) References Cited

U.S. PATENT DOCUMENTS

| | | | | | |
|---|---|---|---|---|---|
| 5,510,578 | A * | 4/1996 | Dunlavy | H01B 11/02 | 174/128.1 |
| D397,085 | S | 8/1998 | Blase | | |
| D457,140 | S | 5/2002 | Roesch | | |
| D459,312 | S | 6/2002 | Roesch | | |
| D461,455 | S | 8/2002 | Forbes | | |
| 6,504,936 | B1 * | 1/2003 | Gutierrez | H04R 27/00 | 361/600 |
| 6,509,659 | B1 * | 1/2003 | Carroll | H01R 27/00 | 455/559 |
| D475,967 | S | 6/2003 | Tsergas | | |
| 6,800,810 | B1 * | 10/2004 | Page | H01B 11/20 | 174/103 |
| 6,928,175 | B1 * | 8/2005 | Bader | H01R 13/703 | 439/441 |
| D513,495 | S | 1/2006 | Hull | | |
| D525,946 | S | 8/2006 | Chung | | |
| D535,949 | S | 1/2007 | Kiely | | |
| D563,896 | S | 3/2008 | Greenslate | | |
| D700,893 | S | 3/2014 | Thomas | | |
| D713,828 | S | 9/2014 | Stifal | | |
| D723,472 | S | 3/2015 | Glisson, Jr. | | |
| D735,170 | S | 7/2015 | Colvin | | |
| D744,431 | S | 12/2015 | Hagarty | | |
| D758,979 | S | 6/2016 | Moon | | |
| D772,815 | S | 11/2016 | Chen | | |
| D835,037 | S | 12/2018 | Reynolds | | |
| 10,652,664 | B1 * | 5/2020 | Sennett | H04R 5/04 | |
| 11,472,303 | B2 * | 10/2022 | Habering | B60L 53/18 | |
| 2002/0087179 | A1 * | 7/2002 | Culp | A61B 17/1626 | 606/1 |
| 2003/0035556 | A1 * | 2/2003 | Curtis | H04S 3/00 | 381/104 |
| 2003/0172797 | A1 * | 9/2003 | Juszkiewicz | G10H 1/0058 | 84/601 |
| 2004/0123996 | A1 * | 7/2004 | Lalancette | H02G 3/12 | 174/50 |
| 2005/0072594 | A1 * | 4/2005 | Gray | H01B 11/12 | 174/108 |
| 2005/0205288 | A1 * | 9/2005 | Fung | H01B 9/003 | 174/113 R |
| 2006/0272483 | A1 * | 12/2006 | Honeywell | G10F 1/02 | 84/609 |
| 2007/0220560 | A1 * | 9/2007 | Devine, III | H01R 24/58 | 725/78 |
| 2008/0053698 | A1 * | 3/2008 | Purves | H02G 3/083 | 174/59 |
| 2008/0139025 | A1 * | 6/2008 | Becker | H01R 31/02 | 439/164 |
| 2009/0090551 | A1 * | 4/2009 | Cunningham | H01R 31/06 | 174/72 A |
| 2013/0153256 | A1 * | 6/2013 | Laughlin | H02G 3/18 | 174/50 |
| 2015/0041172 | A1 * | 2/2015 | Gareis | H01B 7/306 | 87/8 |
| 2016/0293151 | A1 * | 10/2016 | Mayo | G10H 1/0058 | |
| 2017/0268758 | A1 * | 9/2017 | Buck | F21V 23/001 | |
| 2018/0192211 | A1 * | 7/2018 | Møller | H04R 25/505 | |
| 2018/0254030 | A1 * | 9/2018 | Mayo | G10H 1/0008 | |
| 2018/0275363 | A1 * | 9/2018 | Wang | G02B 6/3817 | |
| 2018/0317034 | A1 * | 11/2018 | Orth | H04S 1/002 | |
| 2019/0109445 | A1 * | 4/2019 | Leese | F16M 13/005 | |
| 2019/0289392 | A1 * | 9/2019 | Fuchsl | H04R 5/04 | |
| 2020/0413196 | A1 * | 12/2020 | Sennett | H01R 24/76 | |
| 2021/0217392 | A1 * | 7/2021 | O'Hanlan | G10H 1/0041 | |

FOREIGN PATENT DOCUMENTS

| | | | | | |
|---|---|---|---|---|---|
| KR | 20110064185 | A * | 6/2011 | | |
| WO | WO-2014120608 | A2 * | 8/2014 | G01R 31/04 | |

OTHER PUBLICATIONS

Hammond Organ Company, Hammond Organ Service Manual, with drawings dated Dec. 12, 1995.

Leslie® Speakers Manual, Model 122, 122V, 122RV, 142, 222, 222RV, Installation Instructions, Service Information, & Parts List, dated Jun. 1971.

Leslie® Speakers Owners Manual, Models 122A, 122XB , 147A, 2006 Hammond USA H041414, undated, see Amendment Remarks.

* cited by examiner

| PIN | COLOR | HAMMOND [6H] | |
|---|---|---|---|
| 1 | BLACK | INPUT [BALANCED] | 56a |
| 2 | YELLOW | SIGNAL/DC GROUND | 54b |
| 3 | GRAY | AC POWER IN | 52a |
| 4 | BLUE | AC POWER IN | 52b |
| 5 | BROWN | B+ [APPROX.300VDC] | 54a |
| 6 | RED | INPUT [BALANCED] | 56b |

| PIN | COLOR | HAMMOND [6H] | |
|---|---|---|---|
| 1 | BLACK | INPUT [BALANCED] | 74b |
| 2 | YELLOW | SIGNAL/DC GROUND | 72b |
| 3 | GRAY | AC POWER IN | 70a |
| 4 | BLUE | AC POWER IN | 70b |
| 5 | BROWN | B+ [APPROX.300VDC] | 72a |
| 6 | RED | INPUT [BALANCED] | 74a |

COMMUNICATIONS SYSTEM, RETROFIT CABLING KIT, AND RETROFIT CONNECTOR INTERFACE

CROSS-REFERENCE TO RELATED APPLICATION

The present application is a Non-Provisional Patent Application and claims priority to U.S. Provisional Patent Application Ser. No. 62/961,432, filed Jan. 15, 2020, which is incorporated by reference herein.

TECHNICAL FIELD

The present disclosure relates generally to connector interfaces, cabling kits, and communications systems useful with legacy models of organs and amplifier cabinets.

BACKGROUND

Use of electronic and amplified instruments to make music generally requires multiple electrical connections be made between instruments, amplifiers, and other items, whether performing for an audience or recording in a studio. Most such connections have conventionally been made using cords to transmit power, audio, midi, control, and other signals.

Certain legacy equipment is highly prized by musicians for classic, often recognizable tones and abilities. Among such items are Hammond® brand organs (such as for example models known as B3, C3, etc.) and Leslie® brand power amplifiers (such as for example models known as Type 122, Type 147, etc.). Hammond® brand organs have been often used with Leslie® brand power amplifiers as the characteristics of each are considered to complement each other well.

Hammond® brand organs have employed a pin and socket connector-out design for cable communication with power amplifiers different from many other pieces of musical equipment. Such connectors on the organs are "female" connectors, with multiple pin-receiving sockets arranged generally in a circle for connection to a single plug "male" connector with correspondingly-arranged pins. The sockets can transmit power, or various audio and control signals between the organ and the power amplifier through an attached cable. One common standardized connector type in legacy Hammond® brand organs includes six pins and sockets, although other models include for example five, nine, eleven, or twelve pins and sockets. Some such connectors include different sized pins and sockets to ensure proper orientation, while others included a central, keyed dummy pins and socket for proper alignment. Wires corresponding to each pin/socket run along the connector cable to a connector on the amplifier end. Thus, wires of such connectors carried in a single sheath both power, control, and audio signals.

By way of example, FIGS. 2A-4 show some conventional legacy multi-pin and socket configurations. FIG. 2A shows an 11-pin cabled plug connector A for connection to an 11-pin socket connector B. FIG. 2B shows an 11-pin cabled socket connector C for connection to an 11-pin plug connector D. FIG. 3 shows orientation of pins and sockets in mating 11-pin arrangement E and 11-socket arrangement F. FIG. 4 shows orientation of pins and sockets in mating 6-pin arrangement G and 6-socket arrangement H. As noted above, numerous other legacy multi-conductor connectors exist.

Leslie® brand power amplifiers adopted the Hammond® brand organ pin/socket connector design, in part for convenience because the items were often used together due to their functional characteristics and abilities. Corresponding connector cables included one male plug connector for connection to the organ and one female socket connector for connection to the power amplifier. The amplifier employed the male plug multi-pin design, similar to that of the end of the cable attached to the organ socket.

While such cables and connectors work well for their intended purpose, the cables can be quite large and heavy, and there are drawbacks and limitations to having all the audio, control and power wires run though a single cable. For example, disconnecting the cable disconnects all connections, whereas at times a user may wish to disconnect only some of the connections and leave others (e.g., power) in place. Such is impossible between such legacy equipment using the typical legacy connector cables.

Accordingly, connector interfaces, cabling kits, and communications systems useful with legacy models of organ and amplifier cabinets, that address one or more drawbacks of existing equipment, or one or more of the above issues, that are readily manufactured and installed, that are cost effective, and/or that address any other issues would be welcome.

SUMMARY

According to certain aspects of the disclosure, a retrofit cabling kit and its variously separately usable components is suitable for use connecting an organ and a speaker, wherein the organ is for example one of a Hammond® brand, model B3 or C3 organ and the speaker is one for example of a Leslie® brand, model 122 or 147 speaker. The kit may include interfaces for attachment to each of the organ and the speaker and cables connecting the interfaces. The description, claims, and drawings herein all show different aspects of the components and collective uses of the components and kits made from some or all of the components.

According to certain other aspects of the disclosure, a communications system usable between an output multi-pin socket having at least six conductors and an input multi-pin plug having at least six conductors may include a first interface device having a multi-pin plug having at least six conductors for connection to the at least six conductors of the outlet multi-pin socket, the first interface device also having a first power connector with two conductors, a first speed signal connector with at least two conductors, a first audio signal connector with at least two conductors, and at least six wiring connections between respective conductors of the multi-pin plug and the first power connector, the first speed signal connector, and the first audio signal connector. A second interface device has a multi-pin socket having at least six conductors for connection to the at least six conductors of the input multi-pin plug, the second interface device also having a second power connector with two conductors, a second speed signal connector with at least two conductors, a second audio signal connector with at least two conductors, and at least six wiring connections between respective conductors of the multi-pin socket and the second power connector, the second speed signal connector, and the second audio signal connector. A power cable connects the first power connector and the second power connector. A speed cable connects the first speed signal connector and the second speed signal connector. An audio cable connects the first audio signal connector and the second audio signal connector. Various options and modifications are available.

For example, the system may further include an amplifier cabinet having an amplifier assembly and at least one speaker assembly, the input multi-pin plug being attached to the amplifier assembly for controlling the speaker assembly.

The speaker assembly may include a speaker for producing audio, a rotatable device adjacent the speaker to modify the audio produced by the speaker, and a motor for rotating the rotatable device, the power cable powering the amplifier assembly which in turn powers the motor, a signal transmitted via the speed cable controlling a speed of the motor, and a signal transmitted by the audio cable activating the speaker to produce the audio.

The amplifier may include two of the speaker assemblies.

The second interface device may include a housing configured for attachment to a housing of the amplifier assembly with the multi-pin socket connected to the input multi-pin plug.

The housing of the second interface device may be configured to be spaced from power sockets on the housing of the amplifier assembly used to power the motor.

The system may further include an electric keyboard instrument, the output multi-pin socket being attached to the electric keyboard instrument for providing power to the electric keyboard instrument, and to provide a speed signal, and an audio signal to the speed cable and the audio cable respectively.

The first interface device may include a housing configured for attachment to the electric keyboard instrument with the multi-pin plug connected to the output multi-pin plug.

An output multi-pin socket may be located on one of a Hammond® brand, model B3 or C3 organ and the input multi-pin plug may be located on one of a Leslie® brand, model 122 or 147 speaker.

The output multi-pin socket, the input multi-pin plug, the multi-pin plug, and the multi-pin socket may each have one of six or eleven conductors.

According to certain other aspects of the disclosure, a retrofit cabling kit suitable for use connecting an organ and a speaker, wherein the organ is one of a Hammond® brand, model B3 or C3 organ and the speaker is one of a Leslie® brand, model 122 or 147 speaker may include a first interface device having at least six conductors for connection to the organ, the first interface device also having a first power connector with two conductors, a first speed signal connector with at least two conductors, a first audio signal connector with at least two conductors, and at least six wiring connections between respective conductors and the first power connector, the first speed signal connector, and the first audio signal connector. A second interface device having at least six conductors for connection to the speaker, the second interface device also having a second power connector with two conductors, a second speed signal connector with at least two conductors, a second audio signal connector with at least two conductors, and at least six wiring connections between respective conductors and the second power connector, the second speed signal connector, and the second audio signal connector. A power cable connects the first power connector and the second power connector. A speed cable connects the first speed signal connector and the second speed signal connector. An audio cable connects the first audio signal connector and the second audio signal connector.

Various options and modifications are possible. For example, the first interface device may have a multi-pin plug connected to the at least six conductors of the first interface device for connection to the organ. Also, the second interface device may have a multi-pin socket connected to the at least six conductors of the second interface device for connection to the speaker.

According to certain other aspects of the disclosure, a retrofit cabling kit suitable for use connecting an organ and a speaker, wherein the organ is one of a Hammond® brand, model B3 or C3 organ and the speaker is one of a Leslie® brand, model 122 or 147 speaker may include a first interface device having at least six conductors for connection to the organ, the first interface device also having a power inlet connector with two conductors for receiving mains power, first power connector with two conductors connected to the power inlet connector, a first speed signal connector with at least two conductors, a first audio signal connector with at least two conductors, and at least six wiring connections between respective ones of the at least six conductors for connection to the organ and the power inlet connector, the first speed signal connector, and the first audio signal connector. A second interface device has at least six conductors for connection to the speaker, the second interface device also having a second power connector with two conductors, a second speed signal connector with at least two conductors, a second audio signal connector with at least two conductors, and at least six wiring connections between respective conductors and the second power connector, the second speed signal connector, and the second audio signal connector. A power cable connects the first power connector and the second power connector. A speed cable connects the first speed signal connector and the second speed signal connector. An audio cable connects the first audio signal connector and the second audio signal connector.

Various options and modifications are available. For example, the first interface device may have a multi-pin plug connected to the at least six conductors of the first interface device for connection to the organ. Also, the second interface device may have a multi-pin socket connected to the at least six conductors of the second interface device for connection to the speaker.

According to certain other aspects of the disclosure, a retrofit connector interface usable for connecting an organ and a speaker, wherein the organ is one of a Hammond® brand, model B3 or C3 organ may include at least six conductors for connection to the organ; a power connector with two conductors; a speed signal connector with at least two conductors; an audio signal connector with at least two conductors; and at least six wiring connections between respective conductors and the power connector, the speed signal connector, and the audio signal connector.

Various options and modifications are available. For example, the interface may further include a multi-pin plug connected to the six conductors for connection to the organ, or may further include a power inlet connector with two conductors for receiving mains power, wherein the two conductors of the power connector are connected to the two conductors of the power inlet connector.

According to certain other aspects of the disclosure, a retrofit connector interface suitable for use connecting an organ and a speaker, wherein the speaker is a Leslie® brand, model 122 or 147 speaker may include a at least six conductors for connection to the speaker; a power connector with two conductors; a speed signal connector with at least two conductors; an audio signal connector with at least two conductors; and at least six wiring connections between respective conductors and the power connector, the speed signal connector, and the audio signal connector.

Various options and modifications are available. For example, the interface may include a multi-pin socket connected to the at least six conductors.

DETAILED DESCRIPTION

Figure 1:
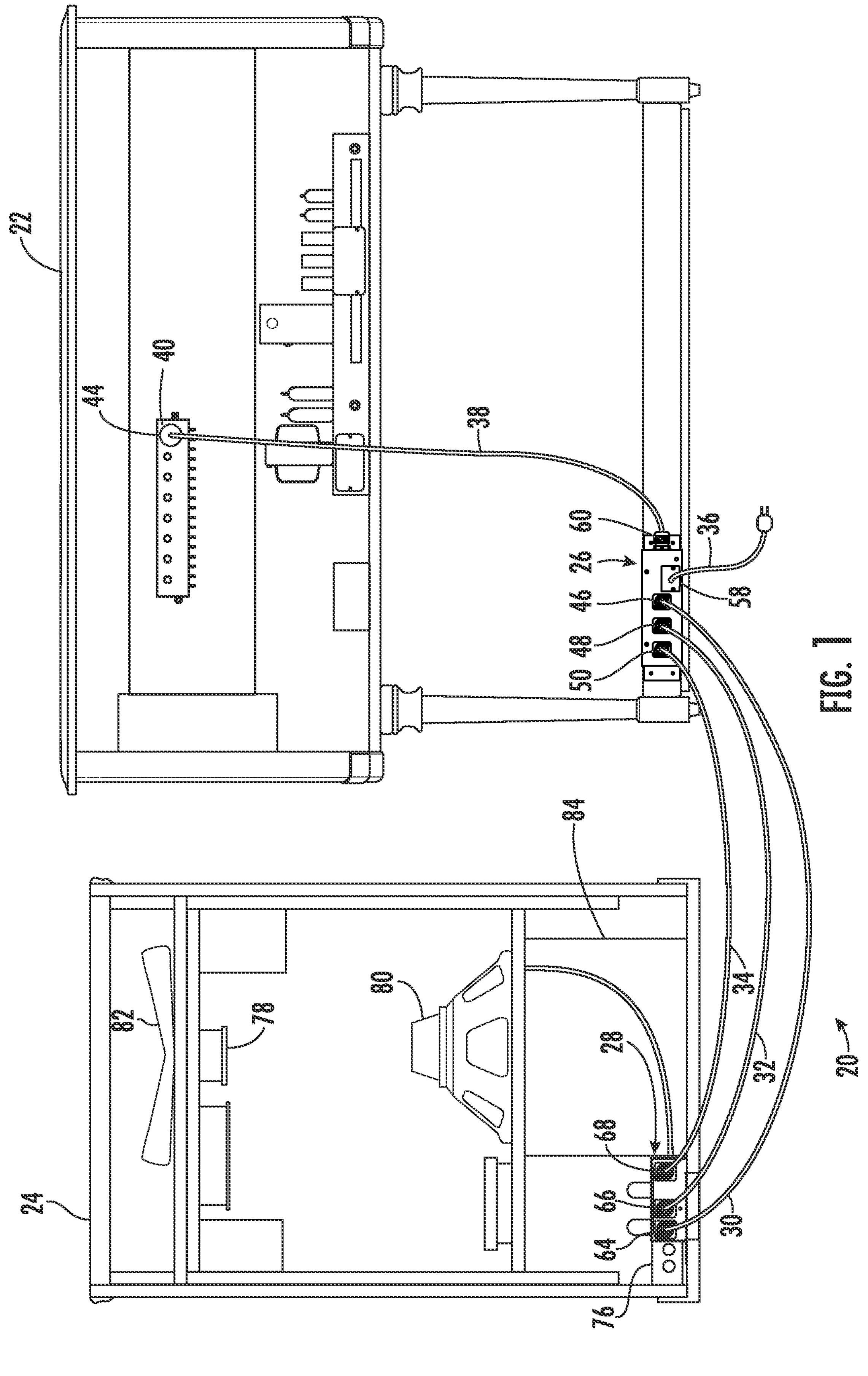
FIG. 1 is a diagrammatic view of a kit of the present disclosure connecting an organ and an amplifier cabinet.
Figure 2A:
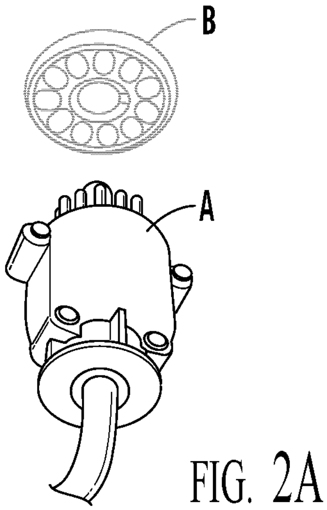
FIG. 2A PRIOR ART
FIG. 2A is an isometric view of a legacy 11-pin plug and socket interface.
Figure 2B:
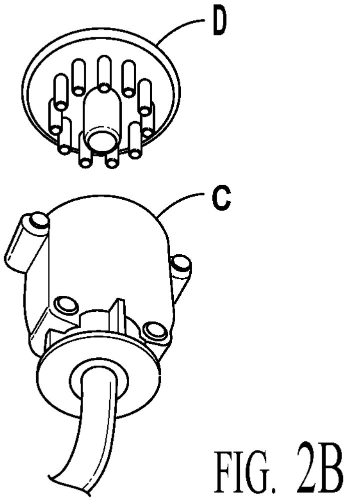
FIG. 2B PRIOR ART
FIG. 2B is an isometric view of a legacy 11-pin socket and plug interface.
Figure 3:
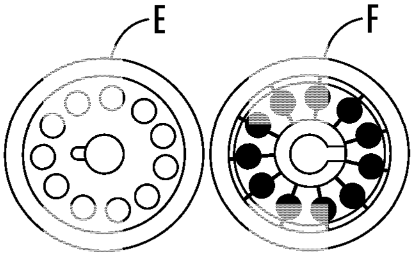
FIG. 3 PRIOR ART
FIG. 3 is an end view of connectors of such a legacy 11-pin interface.
Figure 4:
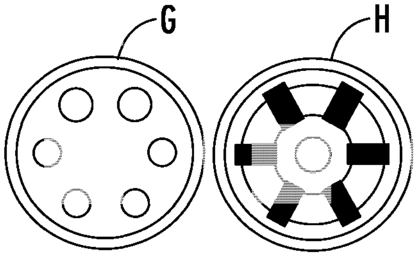
FIG. 4 PRIOR ART
FIG. 4 is an end view of connectors of a legacy 6-pin interface.
Figure 5:
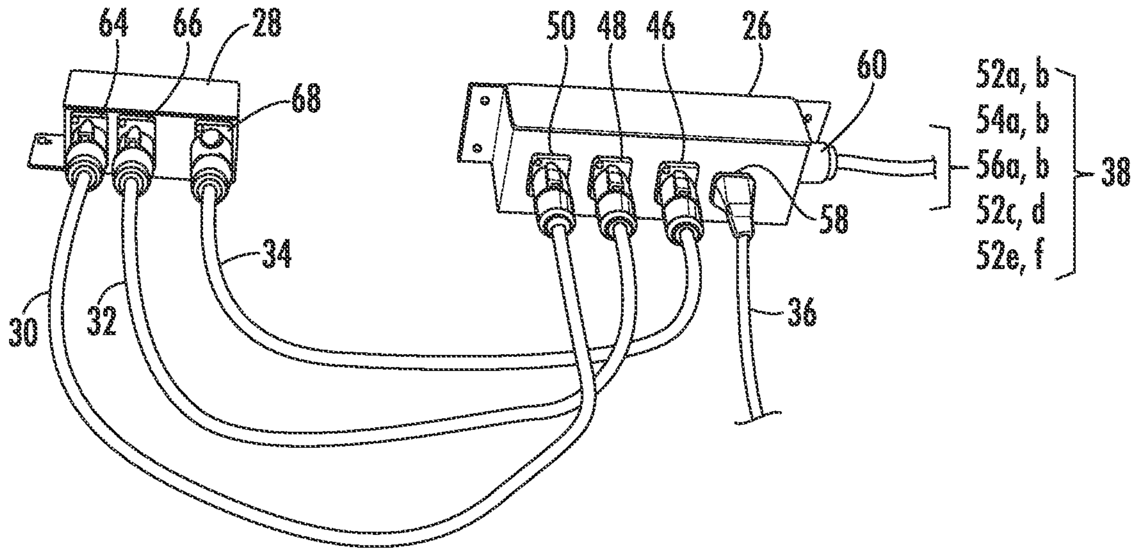
FIG. 5 is an isometric view of a connector kit according to the present disclosure showing two connector boxes and connector and power cables.
Figure 6:
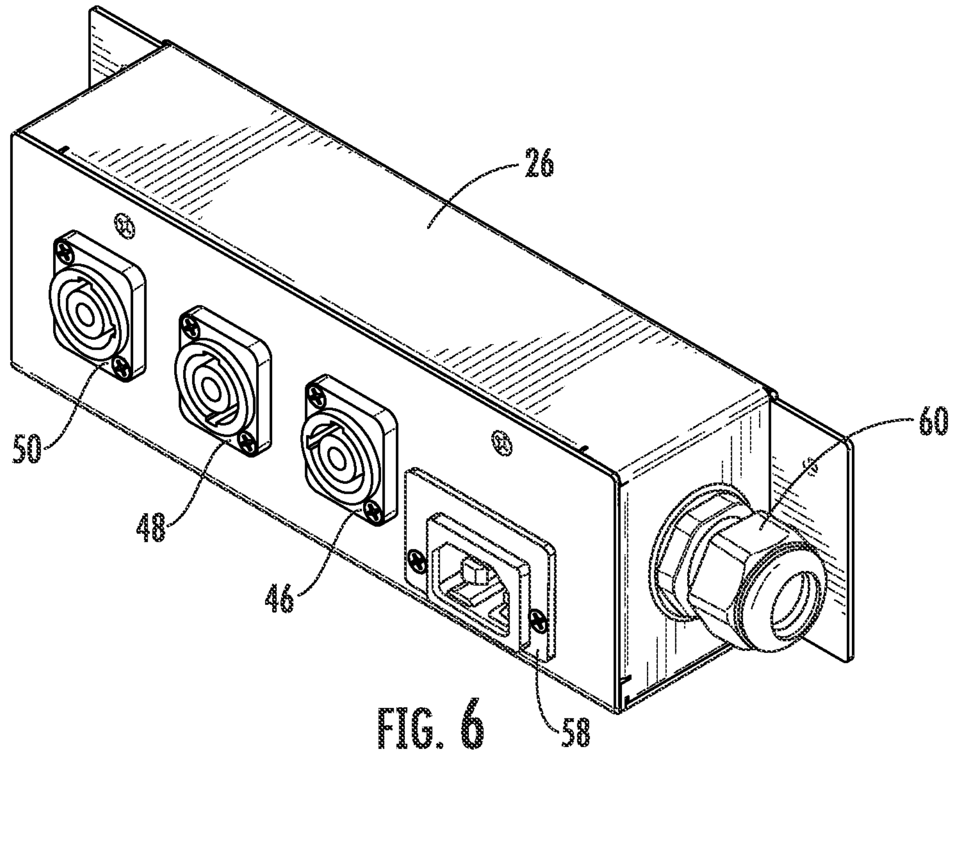
FIG. 6 is an isometric view of a connector box useful with an organ.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

Generally speaking, the Figures depict several examples of a communications system 20 usable between an output multi-pin socket 40 having at least six conductors, which may be on an electrical keyboard musical instrument such as an organ 22, and an input multi-pin plug 42 (see FIG. 16) having at least six conductors, which may be on an amplifier portion 76 of an amplifier cabinet 24. Interfaces may take the form of connector boxes 26 and 28 on the organ and amplifier, respectively, connected by cables 30, 32, and 34. In some embodiments, as discussed below multi-pin socket 40 and/or multi-pin plug 42 may be partially or wholly bypassed or eliminated via hardwiring to internal conductors within the respective organ and/or amplifier, and/or by using other types of connectors.

The communications system 20 may include a first interface device, such as connector box 26, having a multi-pin plug 44 having at least six conductors for connection to the at least six conductors of the outlet multi-pin socket 40. The first interface device includes connectors such as a first power connector 46 with two conductors, a first speed signal connector 48 with at least two conductors, a first audio signal connector 50 with at least two conductors, and at least six wiring connections (extending within cable 38) between respective conductors of the multi-pin plug 44 and the first power connector, the first speed signal connector, and the first audio signal connector. If desired, the wiring conductors within cable 38 may be attached directly to corresponding elements within organ 22 without use of multi-pin plug 44 or multi-pin socket 40 (i.e., via hardwiring ends of conductors within cable 38 to corresponding points within organ 22). Connectors 46,48,50 may be conventional Neutrik® brand socket connectors for use with cables 30, 32, and 34 which may be PowerCon and SpeakOn brand cables, or others.

Figure 7:
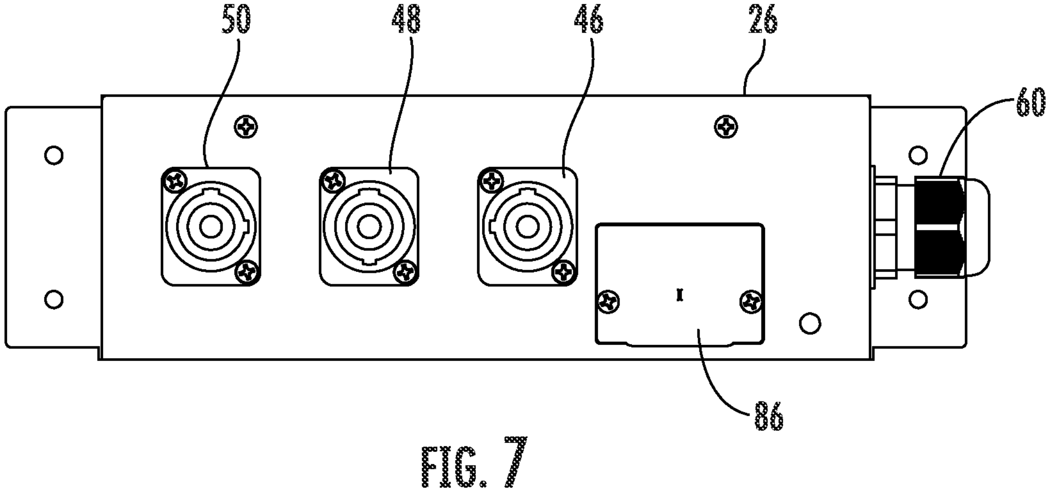
FIG. 7 is a front view of the connector box of FIG. 6.
Figure 8:
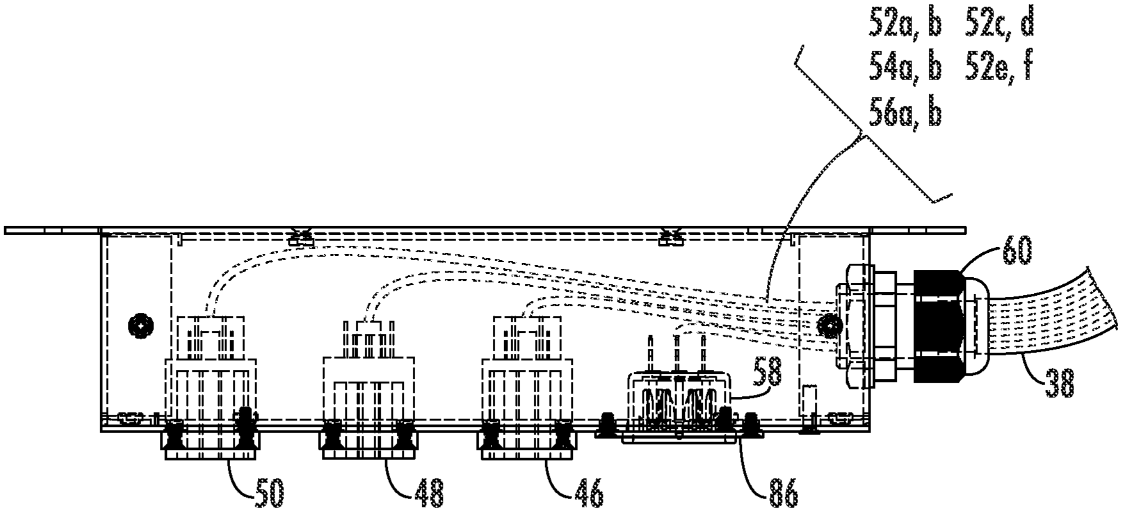
FIG. 8 is a top view of the connector box of FIG. 6.
Figure 9:
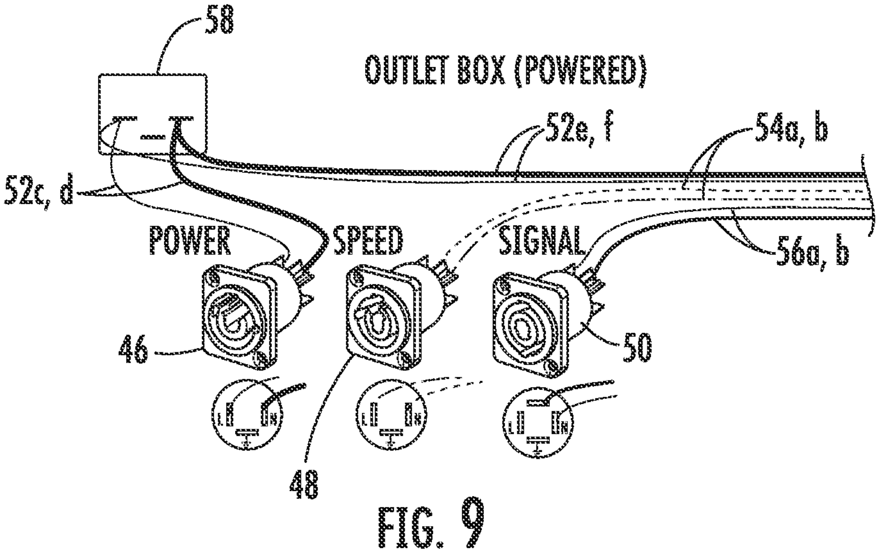
FIG. 9 is a schematic view of one possible powered connector and conductor arrangement for the connector box of FIG. 6.
Figure 10:
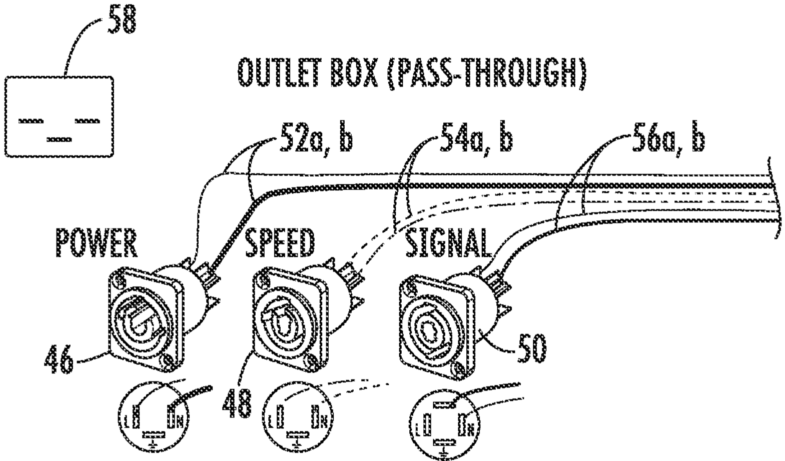
FIG. 10 is a schematic view of one possible pass-through connector and conductor arrangement for the connector box of FIG. 6
Figure 11:
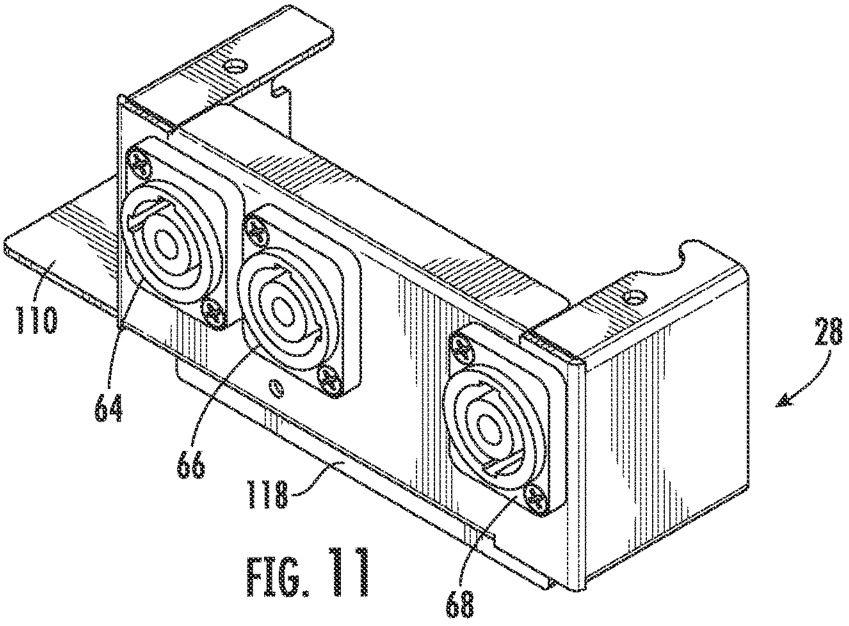
FIG. 11 an isometric view of a connector box useful with an amplifier cabinet, with its lid removed.
Figure 12:
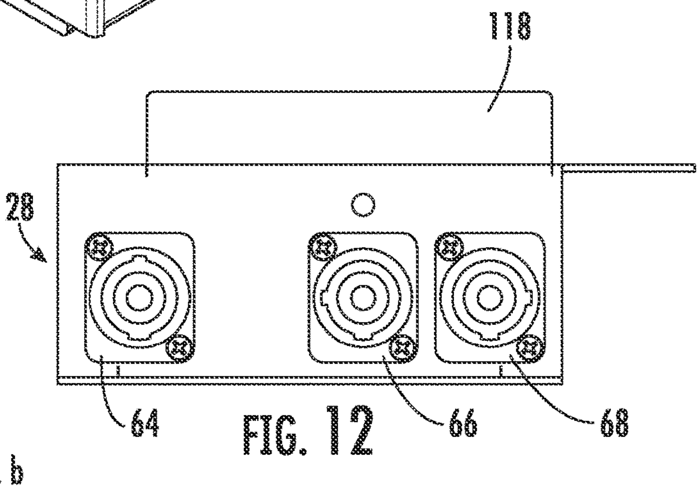
FIG. 12 is a front (inverted) view of the connector box of FIG. 11.

FIG. 10 shows that conductors 52*a* and 52*b* of pass-through version of box 26 provide power signals, conductors 54*a* and 54*b* provide speed signals, and conductors 56*a* and 56*b* provide audio signals to and from organ 22 via cable 38 and either 6-pin socket and plug 40, 44, or hardwiring. FIG. 7 shows an optional cover 86 in place over an electric socket 58 if it is not to be used in such pass-through design. FIG. 9 shows a modified powered version of box 26 in which electric mains cable 36 (see FIG. 1) provides input to box 26 via input socket connector 58. In FIG. 9 conductors 52*c* and 52*d* connect connector 46 to connector 58, and conductors 52*e* and 52*f* connect connector 58 to organ 22 via 6-pin socket and plug 40,44 or hardwiring. In all examples, a gland 60 or other secure opening cover may be provided for feeding conductors from box 26 to organ 22.

All of conductors 52, 54, and 56 may be located in cable 38 in a legacy 6-conductor cable or within three separate 2-conductor cables separated according to function. Also, as noted, some or all of the conductors may be fed to and connected to different points via hardwiring or other connectors within organ 22 rather than the depicted connector 40. Thus, interface box 26 provides a connection and break-out capability, both powered and pass-though (discussed below), for further connection to amplifier 24 via cables 30, 32, and 34 and interface box 28.

Figure 13:
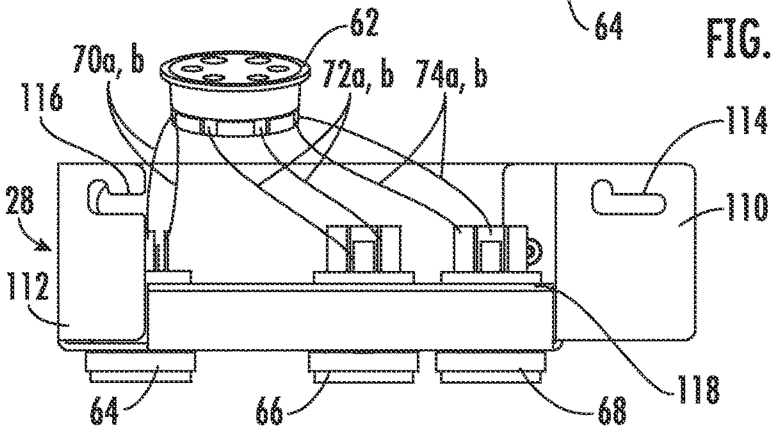
FIG. 13 is a top view of the connector box of FIG. 11.
Figure 14:
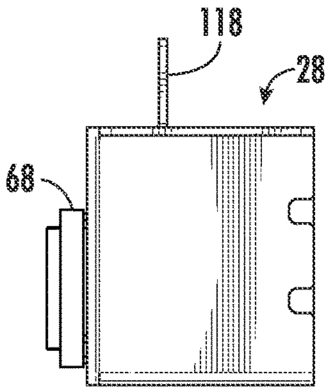
FIG. 14 is a side (inverted) view of the connector box of FIG. 11.
Figure 15:
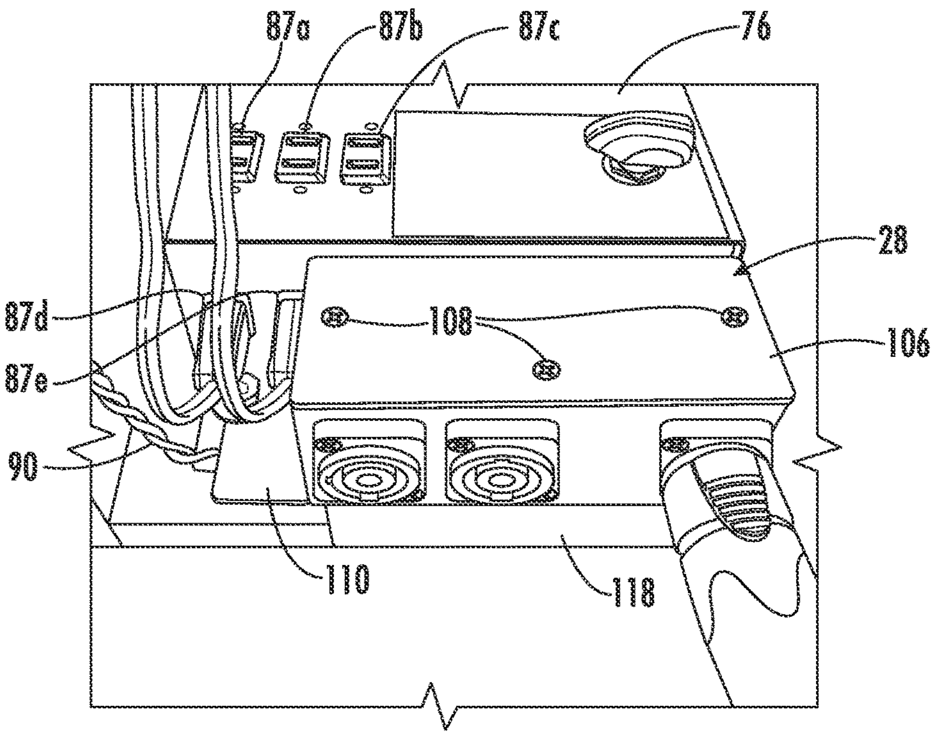
FIG. 15 is an isometric view showing attachment of the connector box of FIG. 11 to an amplifier portion of an amplifier cabinet, as in FIG. 1, with one connector connected.
Figure 16:
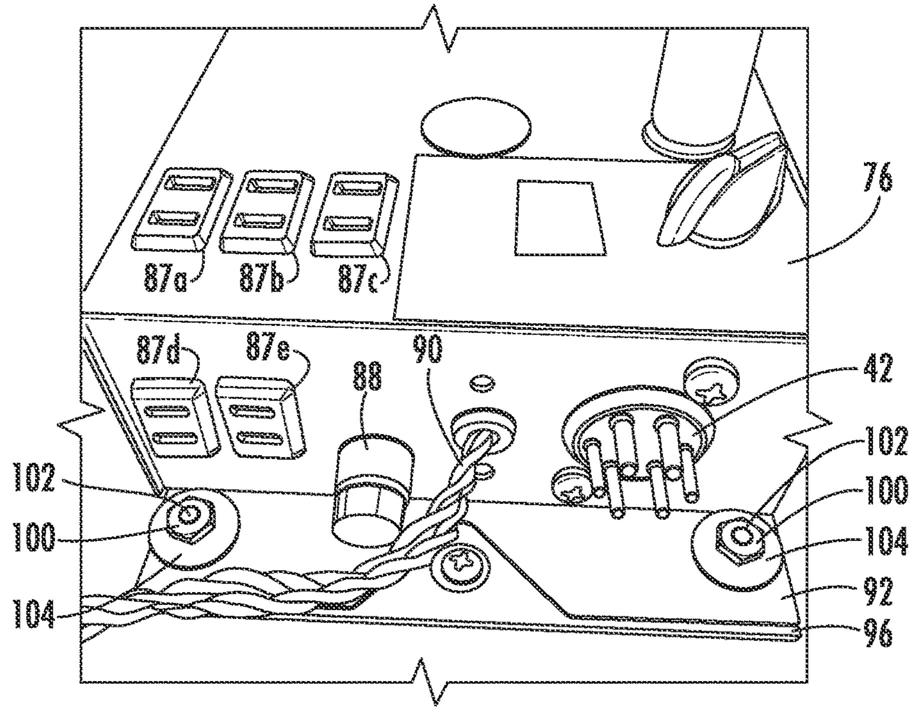
FIG. 16 is an isometric view as in FIG. 15, with the connector box removed, showing connection points (6-pin socket and screws).
Figure 17:
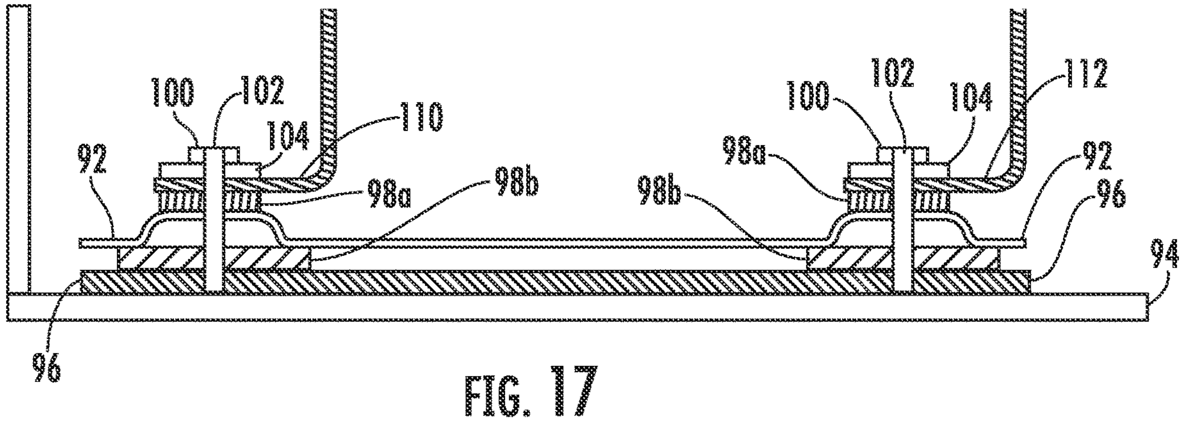
FIG. 17 is a partial schematic cross-section showing connection of the connector box and amplifier portion as in FIG. 15.
Figure 18:
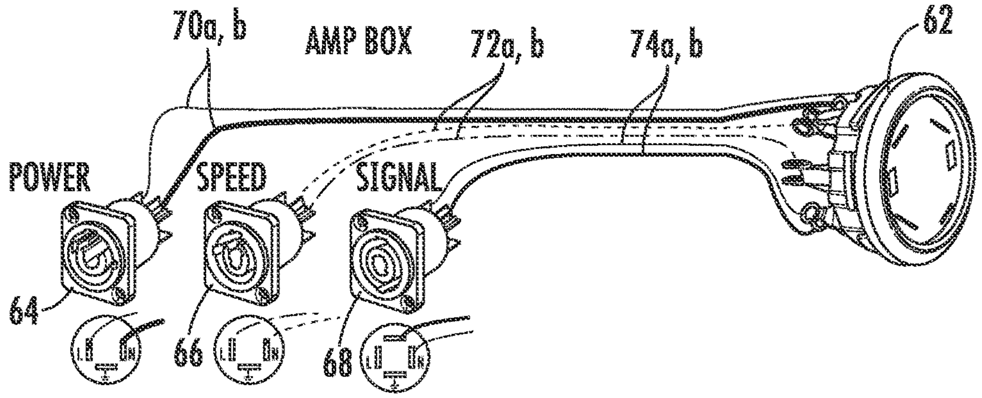
FIG. 18 is a schematic view of one possible connector and conductor arrangement for the connector box of FIG. 11.

Second interface device may be box 28 having a multi-pin socket 62 (see FIG. 13) having at least six conductors for connection to the at least six conductors of the input multi-pin plug 42 (see FIG. 16). Second interface device has a second power connector 64 with two conductors, a second speed signal connector 66 with at least two conductors, a second audio signal 68 connector with at least two conductors, and at least six wiring connections between respective conductors of the multi-pin socket and the second power connector (conductors 70*a* and 70*b*), the second speed signal connector (conductors 72*a* and 72*b*), and the second audio signal connector (conductors 74*a* and 74*b*). Box 28 is attachable to amplifier portion 76 with 6-pin socket 62 attached to 6-pin plug 42. Box 28 is sized and configured to be removably attachable to amplifier portion 76 as located on legacy Leslie® brand amplifiers at a bottom rear portion without damaging or unduly impeding access to other plugs and elements (tubes, etc.), for example using exciting hardware connectors already in place. As above, if desired, plug and socket 42,62 could be eliminated and conductors could be hardwired to the amplifier and/or one or more other connectors could be employed.

Power cable 30 connects the first power connector 46 and the second power connector 64; speed cable 32 for connects the first speed signal connector 48 and the second speed signal connector 66; and audio cable 34 connects the first audio signal connector 50 and the second audio signal connector 68.

Different legacy system amplifiers and organs may operate in different ways, so that different types of signals may be carried by the cables 30, 32, and 34. For example, in amplifiers with at least one and commonly two speakers 78 and 80 and two respective rotating sound altering devices 82 and 84, each device may be driven by a dual motor arrangement (not shown) in which the dual motors for each device 82/84 cause the devices to rotate at different speeds (generating different sounds). Some legacy organ and amplifier system use a 120V AC on/off signal (organ to amplifier) through conductors of the legacy cables/6-pin connectors to provide such signaling. The speed signal can control a mechanical relay switch to select which of the dual motors is to be operated for the desired sound. Thus, such signal can be provided by cable 32 and its various connector and conductors from organ connector 40 to amplifier connector 42, incorporating and such signaling controls typically sent or received by the organ and/or amplifier. Alternatively, in some legacy systems, such motor control and/or switching signal is provided as an imbedded 32V DC signal embedded within the audio signal. In such case, power cable 32 can carry a 300V DC/ground signal from amplifier to organ, as is commonly done using conductors of existing legacy cables. Separating the power, control, and audio signals into separate cables may allow for better transmission and shielding, and more connection/disconnection options than use of legacy connectors. Such benefits are also available if 11-pin connector systems are used to carry the various signals that legacy organ and amplifier systems may require, although additional connectors and cables, and/or different multi-conductor connectors and cables, etc., may be required. Additionally, newer connector designs as employed herein allow twist-lock, spring-loaded engagements and such for more secure connection and prevention of disconnection than legacy 6- and 11-pin connectors.

Thus, the disclosed system may be employed as a retrofit cabling kit suitable for use connecting an organ 22 and an amplifier/speaker 24, wherein the organ is one of a Hammond® brand, model B3 or C3 organ and the speaker is one of a Leslie® brand, model 122 or 147 speaker. The system may be employed in whole or in part (i.e., just replacing a connection interface at the amp or the organ with a box 26 or 28 at one or the other), and modifying cables accordingly (i.e., having a legacy style six-pin connector attached at one end with cables that separate into the equivalent of cables 30, 32, and 34 at the other end). Also, as noted, plug and socket multi-pin connections to the organ and/or amplifier may be replaced with hardwired and/or other connections.

FIGS. 11-17 show aspects of the system that allows it to be used well with legacy amplifiers. As shown, amplifier portion 76 of amplifier cabinet 24 is located at a bottom edge and includes 6-pin connector 42. Other electric plug sockets 87*a*-*e* for connecting motors and other elements within the system are provided, adjacent a fuse 88, and amplified sound transmitting wires 90. Amplifier portion 76 has a bottom plate 92 for mounting to cabinet bottom 94 via a base plate 96, grommets 98*a* and 98*b*, nuts 100, bolts 102, and washers 104. To attach box 28, lid 106 of box 28 is removed using screws 108, and connector 62 is attached to connector 42. Nuts 100 are loosened (or removed) to allow washers 104 to move upwardly enough that flanges 110, 112 can be slid into place beneath washer using L-shaped slots 114, 116 in flanges to receive bolts 102. Nuts are then tightened to clamp flanges 110 and 112 beneath washers 104 to hold box 28 in place on amplifier portion 76. Lid 106 can then be replaced. If desired, a lower flange 118 can be provided to extend downwardly from box 28 to provide a further line of contact with cabinet bottom 94 to support and protect the connection and elements above.

While one or more preferred embodiments have been described above, it is to be understood that any and all equivalent realizations of the disclosed subject matter are included within the scope and spirit thereof. Thus, the embodiments depicted are presented by way of example only and are not intended as limitations upon the present invention. Thus, while particular embodiments have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

I claim:

1. A communications system configured to connect an output multi-pin socket having at least six conductors and an input multi-pin plug having at least six conductors, the communications system comprising:

a first interface device having a multi-pin plug having at least six conductors configured for connection to the at least six conductors of the outlet multi-pin socket, the first interface device also having a first power connector with two conductors, a first speed signal connector with at least two conductors, a first audio signal connector with at least two conductors, and at least six wiring connections between the at least six conductors of the multi-pin plug and the two conductors of the first power connector, the at least two conductors of the first speed signal connector, and the at least two conductors of the first audio signal connector;

a second interface device having a multi-pin socket having at least six conductors configured for connection to the at least six conductors of the input multi-pin plug, the second interface device also having a second power connector with two conductors, a second speed signal connector with at least two conductors, a second audio signal connector with at least two conductors, and at least six wiring connections between the at least six conductors of the multi-pin socket and the two conductors of the second power connector, the at least two conductors of the second speed signal connector, and the at least two conductors of the second audio signal connector;

a power cable configured for connecting the first power connector and the second power connector;

a speed cable configured for connecting the first speed signal connector and the second speed signal connector; and an audio cable configured for connecting the first audio signal connector and the second audio signal connector.

2. The communications system of claim 1, wherein the input multi-pin plug is a component of an amplifier assembly controlling a speaker assembly of the amplifier assembly.

3. The communications system of claim 2, wherein the speaker assembly includes a speaker configured for producing audio, a rotatable device adjacent the speaker configured to modify the audio produced by the speaker, and a motor configured for rotating the rotatable device, wherein when the multi-pin socket is operatively connected to the input multi-pin plug the power cable powers the amplifier assembly which in turn powers the motor, a signal transmitted via the speed cable controls a speed of the motor, and a signal transmitted by the audio cable activates the speaker to produce the audio.

4. The communications system of claim 3, wherein the amplifier assembly includes two of the speaker assemblies.

5. The communications system of claim 2, wherein the second interface device includes a housing configured for attachment to a housing of the amplifier assembly with the multi-pin socket connected to the input multi-pin plug.

6. The communications system of claim 5, wherein the housing of the second interface device is configured to be spaced from power sockets on the housing of the amplifier assembly used to power a motor used to rotate a rotatable device modifying audio produced by a speaker.

7. The communications system of claim 1, wherein the output multi-pin socket is a component of an electric keyboard instrument for providing power to the electric keyboard instrument, for providing a speed signal to the speed cable, and for providing an audio signal to the audio cable.

8. The communications system of claim 7, wherein the first interface device includes a housing configured for attachment to the electric keyboard instrument with the multi-pin plug connected to the output multi-pin socket.

9. The communications system of claim 1, wherein the output multi-pin socket is a component of one of a Hammond® brand, model B3 or C3 organ and the input multi-pin plug is a component of one of a Leslie® brand, model 122 or 147 speaker.

10. The communications system of claim 1, wherein the output multi-pin socket, the input multi-pin plug, the multi-pin plug, and the multi-pin socket each have one of six or eleven conductors.

11. A retrofit cabling kit configured to connect an organ and a speaker, wherein the organ is one of a Hammond® brand, model B3 or C3 organ and the speaker is one of a Leslie® brand, model 122 or 147 speaker, the retrofit cabling kit comprising:

a first interface device having at least six conductors configured for connection to the organ, the first interface device also having a first power connector with two conductors, a first speed signal connector with at least two conductors, a first audio signal connector with at least two conductors, and at least six wiring connections between the at least six conductors of the first interface device and the two conductors of the first power connector, the at least two conductors of the first speed signal connector, and the at least two conductors of the first audio signal connector;

a second interface device having at least six conductors configured for connection to the speaker, the second interface device also having a second power connector with two conductors, a second speed signal connector with at least two conductors, a second audio signal connector with at least two conductors, and at least six wiring connections between the at least six conductors of the second interface device and the two conductors of the second power connector, the at least two conductors of the second speed signal connector, and the at least two conductors of the second audio signal connector;

a power cable configured for connecting the first power connector and the second power connector;

a speed cable configured for connecting the first speed signal connector and the second speed signal connector; and an audio cable configured for connecting the first audio signal connector and the second audio signal connector.

12. The kit of claim 11, wherein the first interface device has a multi-pin plug connected to the at least six conductors of the first interface device configured for connection to the organ.

13. The kit of claim 11, wherein the second interface device has a multi-pin socket connected to the at least six conductors of the second interface device configured for connection to the speaker.

14. A retrofit cabling kit configured to connect an organ and a speaker, wherein the organ is one of a Hammond® brand, model B3 or C3 organ and the speaker is one of a Leslie® brand, model 122 or 147 speaker, the retrofit cabling kit comprising:

a first interface device having at least six conductors configured for connection to the organ, the first interface device also having a power inlet connector with two conductors configured for receiving mains power, a first power connector with two conductors connected to the power inlet connector, a first speed signal connector with at least two conductors, a first audio signal connector with at least two conductors, and at least six wiring connections between respective ones of the at least six conductors of the first interface device configured for connection to the organ and the two conductors of the power inlet connector, the at least two conductors of the first speed signal connector, and the at least two conductors of the first audio signal connector;

a second interface device having at least six conductors configured for connection to the speaker, the second interface device also having a second power connector with two conductors, a second speed signal connector with at least two conductors, a second audio signal connector with at least two conductors, and at least six wiring connections between respective ones of the at least six conductors of the second interface device and the two conductors of the second power connector, the at least two conductors of the second speed signal connector, and the at least two conductors of the second audio signal connector;

a power cable configured for connecting the first power connector and the second power connector;

a speed cable configured for connecting the first speed signal connector and the second speed signal connector; and an audio cable configured for connecting the first audio signal connector and the second audio signal connector.

15. The kit of claim 14, wherein the first interface device has a multi-pin plug connected to the at least six conductors of the first interface device configured for connection to the organ.

16. The kit of claim 14, wherein the second interface device has a multi-pin socket connected to the at least six conductors of the second interface device configured for connection to the speaker.

17. A retrofit connector interface configured to connect an organ and a speaker, wherein the organ is one of a Hammond® brand, model B3 or C3 organ, the retrofit connector interface comprising:

at least six conductors configured for connection to the organ;

a power connector with two conductors;

a speed signal connector with at least two conductors;

an audio signal connector with at least two conductors; and at least six wiring connections between respective ones of the at least six conductors and the two conductors of the power connector, the at least two conductors of the speed signal connector, and the at least two conductors of the audio signal connector.

18. The interface of claim 17, further including a multi-pin plug connected to the six conductors configured for connection to the organ.

19. The interface if of claim 17, further including a power inlet connector with two conductors for receiving mains power, wherein the two conductors of the power connector are connected to the two conductors of the power inlet connector.

20. A retrofit connector interface configured to connect an organ and a speaker, wherein the speaker is a Leslie® brand, model 122 or 147 speaker, the retrofit connector interface comprising:

at least six conductors configured for connection to the speaker;

a power connector with two conductors;

a speed signal connector with at least two conductors;

an audio signal connector with at least two conductors; and at least six wiring connections between respective ones of the at least six conductors and the two conductors of the power connector, the at least two conductors of the speed signal connector, and the at least two conductors of the audio signal connector.

21. The interface of claim 20, further including a multi-pin socket connected to the at least six conductors.

* * * * *